US008467077B2

(12) United States Patent
Aoki

(10) Patent No.: US 8,467,077 B2
(45) Date of Patent: Jun. 18, 2013

(54) PAGE DESCRIPTION DATA PROCESSING APPARATUS, PAGE DESCRIPTION DATA PROCESSING METHOD, AND RECORDING MEDIUM

(75) Inventor: Yasuharu Aoki, Minato-ku (JP)

(73) Assignee: FUJIFILM Corporation, Tokyo (JP)

( * ) Notice: Subject to any disclaimer, the term of this patent is extended or adjusted under 35 U.S.C. 154(b) by 267 days.

(21) Appl. No.: 13/074,737

(22) Filed: Mar. 29, 2011

(65) Prior Publication Data

US 2011/0242572 A1 Oct. 6, 2011

(30) Foreign Application Priority Data

Mar. 30, 2010 (JP) ................................. 2010-079466

(51) Int. Cl.
*G06F 3/12* (2006.01)
(52) U.S. Cl.
USPC .......................................... 358/1.13; 715/276
(58) Field of Classification Search
USPC ................ 358/1.13, 1.14, 1.15, 1.9, 515, 521
See application file for complete search history.

(56) References Cited

U.S. PATENT DOCUMENTS

| 5,357,583 | A  | * | 10/1994 | Sato et al. ....................... 382/269 |
| 6,552,815 | B2 | * | 4/2003  | Schwarz, Jr. et al. ........ 358/1.13 |
| 2005/0007611 | A1 | | 1/2005 | Matsukubo et al. |
| 2006/0008114 | A1 | | 1/2006 | Sekiguchi et al. |
| 2007/0279705 | A1 | * | 12/2007 | Takiyama et al. ............. 358/453 |
| 2008/0297814 | A1 | | 12/2008 | Jacobs et al. |
| 2011/0116136 | A1 | | 5/2011 | Tamura |

FOREIGN PATENT DOCUMENTS

JP 2005-070957 A 3/2005

OTHER PUBLICATIONS

Adobe Systems, Adobe Portable Document Format Version 1.3, ISBN 0-201-61588-6, Jul. 2000, pp. 136 and 141-143, second edition, 1st printing, Pearson Education.
Adobe Systems, Adobe Portable Document Format Version 1.3, ISBN 0-201-61588-6, Jul. 2000, p. 139, second edition, 1st printing, Pearson Education.
Non-Final Office Action, dated Jan. 7, 2013, issued in co-pending U.S. Appl. No. 13/074,297, 12 pages.

* cited by examiner

*Primary Examiner* — King Poon
*Assistant Examiner* — Ibrahim Siddo
(74) *Attorney, Agent, or Firm* — Sughrue Mion, PLLC

(57) ABSTRACT

With respect to an object for stroking a path existing in page description data, the configurations of a plurality of line elements formed along the path are estimated based on a path construction operator and a dotted line pattern determining operator. The path construction operator is replaced with a plurality of path construction operators depending on the configurations of the line elements.

6 Claims, 10 Drawing Sheets

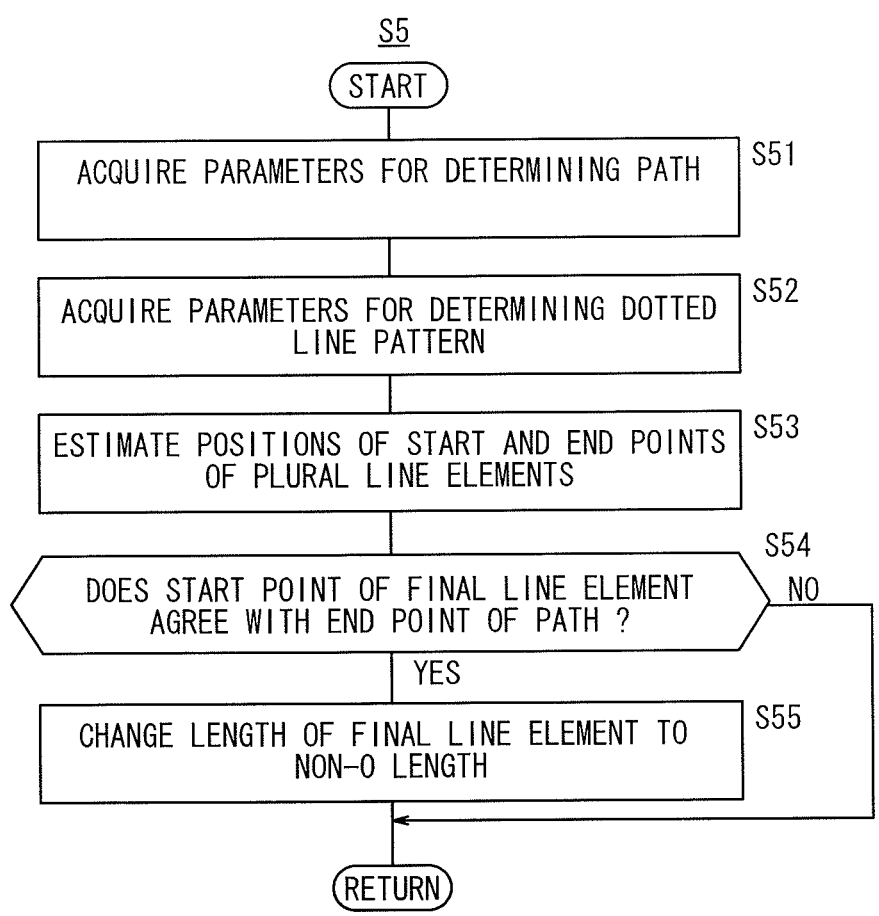

PAGE DESCRIPTION DATA PROCESSING APPARATUS, PAGE DESCRIPTION DATA PROCESSING METHOD, AND RECORDING MEDIUM

CROSS-REFERENCE TO RELATED APPLICATION

This application is based upon and claims the benefit of priority from Japanese Patent Application No. 2010-079466 filed on Mar. 30, 2010, of which the contents are incorporated herein by reference.

BACKGROUND OF THE INVENTION

1. Field of the Invention

The present invention relates to a page description data processing apparatus, a page description data processing method, and a recording medium for performing a particular processing sequence on page description data having a certain attribute, from among page description data described by a page description language (PDL), for thereby converting the page description data into more robust page description data (hereinafter referred to as "fortified page description data").

2. Description of the Related Art

In recent years, DTP processes for setting characters and images generated by a user via a computer into one or more electronic pages using DTP (Desktop Publishing) application software installed on the computer have been widely used in printing and platemaking fields.

Such DTP application software generates page description data, which express images of respective pages based on elements such as characters and images that are edited by the user.

Page description data are defined by vector data independent of the resolution of an output machine such as a printer, a platesetter, or the like, and such data cannot be output per se from the output machine. Therefore, the page description data are rasterized by a RIP (Raster Image Processor) into raster image data comprising a cluster of dots representative of elements such as characters and images in the pages.

When raster image data are supplied to the output machine such as a printer, a platesetter, or the like, the output machine outputs a hard copy or a printing plate, which carries an image based on the raster image data (see Japanese Laid-Open Patent Publication No. 2005-070957).

PDF (Portable Document File) version 1.3, which forms one type of page description data, incorporates therein a "dotted line pattern" operator for controlling a pattern of line elements and gaps, which are utilized in stroking a linear path. The term "path" refers to a path having no intrinsic line width, and which interconnects a start point and an end point. The term "stroke" refers to a process of applying a certain line width to a path.

Variables which can be set by the "dotted line pattern" operator include a "dotted line array" for designating a length for line elements and gaps that appear alternately, and a "dotted line phase" for designating a plotted state at the start point of a periodic dotted line. For details, reference should be made to PDF Reference, second edition, Adobe Portable Document Format Version 1.3, initial edition, 1st printing, published July, 2000, Author: Adobe Systems, Publisher: Pearson Education, ISBN 0-201-61588-6, pages 136 and 141-143. The terms "dotted line array" and "dotted line phase" may hereinafter be referred to collectively as "dotted line configuration parameters."

The relationship between dotted line configuration parameters and a dotted line pattern that actually is plotted will be described in detail below with reference to FIG. 10A of the accompanying drawings, based on an example in which a linear path is stroked with 11 unit lengths from a start point to an end point thereof.

For example, in FIG. 10A, [4 2] {0} implies a coupling of parameters as a dotted line array [4 2] and a dotted line phase {0}. The dotted line array [4 2] represents turning-on of 4 successive unit lengths, followed by turning-off of 2 successive unit lengths. In other words, the dotted line pattern has a periodicity unit represented by 6 unit lengths. Stated otherwise, the dotted line pattern comprises a repetition of line elements, each of which are 4 unit lengths long, and gaps, each of which are 2 unit lengths long.

The dotted line phase {0} indicates that the above periodic dotted line pattern includes a phase shift of 0. The periodic dotted line pattern having such a dotted line phase {0} is illustrated in the upper section of FIG. 10A, whereas a periodic dotted line pattern having a dotted line phase {1} is illustrated in a middle section of FIG. 10A. The periodic dotted line pattern having the dotted line phase {1} is equivalent to the periodic dotted line pattern having the dotted line phase {0} if shifted one unit length to the left (toward the start point of the path). Similarly, a periodic dotted line pattern having a dotted line phase {2} is illustrated in a lower section of FIG. 10A, which is equivalent to the periodic dotted line pattern having the dotted line phase {0} if shifted two unit lengths to the left (toward the start point of the path).

According to PDF specifications, as illustrated above, the plotted configuration of a dotted line is determined sequentially based on a prescribed periodic repetition from the start point to the end point of the dotted line.

However, PDF specifications are susceptible to unexpected problems when a dotted line pattern generated along a linear path is rasterized.

For example, when the start point and the end point of each line element, i.e., the end point and the start point of each gap, are determined, the points may suffer a positional shift error, because the position of the start point or the end point differs from RIP to RIP. The positional shift error refers to a so-called processing error caused by different RIP processing algorithms or software versions. Accordingly, as shown in FIGS. 10B and 10C of the accompanying drawings, the number of generated line elements of one path may be different from the number of generated line elements of another path, even if the paths are of the same length.

In FIG. 10B, if an end point 202a of a line element 200a and an end point 202b of a line element 200b are different from each other due to processing errors, then a start point 206a of a line element 204a, which is adjacent to the line element 200a, exists at a position that lies beyond an end position 208 of the path, i.e., to the right side of the end position 208. Additionally, a start point 206b of a line element 204b, which is adjacent to the line element 200b, exists at a position that is not beyond the end position 208 of the path, i.e., to the left side of the end position 208.

FIG. 10C shows an upper dotted line, which is made up of the line element 200a and the next line element 204a, and a lower dotted line, which is made up of the line element 200b and the next line element 204b. The dotted lines are imparted with a certain line width by means of a stroking process.

As shown in FIG. 10C, a filled area 210a is formed around the line element 200a, and a filled area 210b also is formed around the line element 200b, according to a line width and a capping format (end processing format), which are preset in the stroking process.

However, a filled area is not formed around the next line element 204*a* following the start point 206*a* (the upper dotted line) because the start point 206*a* is positioned outside of the path. On the other hand, a filled area 212 having an oblong shape is formed around a portion of the next line element 204*b* following the start point 206*b* (the lower dotted line) because the start point 206*b* is positioned within the path.

As described above, when a dotted line pattern is formed along a linear path, a line element may be generated indeterminately in the vicinity of the end point of the linear path, depending on a combination of processing errors caused by the RIP processing algorithm, the software version, and dotted line configuration parameters. Consequently, the dotted line pattern may be converted unintentionally into a dotted line configuration. When the image data including the dotted line is rasterized, such an unintended dotted line configuration possibly may result in unexpected printing difficulties, the cause of which is difficult to analyze. Such a problem manifests itself in particular when the line width is large.

SUMMARY OF THE INVENTION

It is an object of the present invention to provide a page description data processing apparatus, a page description data processing method, and a recording medium, which make it possible to prevent printing difficulties from occurring in a process of rasterizing image data including a dotted line therein.

According to the present invention, there is provided a page description data processing apparatus comprising an object confirming unit which confirms whether or not page description data contains an object for stroking a path, an operator confirming unit which, if the page description data contains the object for stroking the path, confirms whether or not a dotted line pattern determining operator for determining a dotted line pattern is contained within the object, a dotted line configuration estimator which, if the dotted line pattern determining operator for determining the dotted line pattern is contained within the object, estimates configurations of a plurality of line elements formed along the path based on a path construction operator for constructing the path and the dotted line pattern determining operator, and a path construction operator replacer which replaces the path construction operator with a plurality of path construction operators depending on the configurations of the line elements.

As described above, the path construction operator replacer replaces the path construction operator with a plurality of path construction operators depending on the configurations of the line elements. Therefore, it is possible to prevent the phenomenon of generating a line element indeterminately in the vicinity of the end point of the path, since a process for approximating the dotted line pattern along the path with a plurality of line elements is not carried out during the rasterizing process of a RIP. Thus, the page description data are prevented from leading to printing difficulties during the rasterizing image data process, which includes dotted lines.

The dotted line configuration estimator preferably estimates the configurations of the line elements formed along a curved path. Since complex calculations are required to identify a curved configuration and a line element is highly likely to be generated indeterminately near the end point of the path, the operation sequence of the dotted line configuration estimator is highly effective.

The path construction operator replacer preferably replaces the path construction operator with a plurality of linear path construction operators depending on the configurations of the line elements. Therefore, the process of replacing the linear path construction operator is simplified and the dotted line pattern is reproduced accurately.

The path construction operator replacer preferably replaces the path construction operator with the plurality of path construction operators for making a length of each path non-0. It is thus possible to apply a cap in an appropriate direction in alignment with the direction in which an adjacent line element extends.

According to the present invention, there is also provided a page description data processing method comprising the steps of confirming whether or not page description data contains an object for stroking a path, if the page description data contains the object for stroking the path, confirming whether or not a dotted line pattern determining operator for determining a dotted line pattern is contained within the object, if the dotted line pattern determining operator for determining the dotted line pattern is contained within the object, estimating configurations of a plurality of line elements formed along the path based on a path construction operator for constructing the path and the dotted line pattern determining operator, and replacing the path construction operator with a plurality of path construction operators depending on the configurations of the line elements.

According to the present invention, there is further provided a recording medium storing therein a program that controls a computer to inspect an attribute of page description data and to perform a process depending on the inspected attribute on the page description data, the program enabling the computer to function as an object confirming unit which confirms whether or not the page description data contains an object for stroking a path, an operator confirming unit which, if the page description data contains the object for stroking the path, confirms whether or not a dotted line pattern determining operator for determining a dotted line pattern is contained within the object, a dotted line configuration estimator which, if the dotted line pattern determining operator for determining the dotted line pattern is contained within the object, estimates configurations of a plurality of line elements formed along the path based on a path construction operator for constructing the path and the dotted line pattern determining operator, and a path construction operator replacer which replaces the path construction operator with a plurality of path construction operators depending on the configurations of the line elements.

With the page description data processing apparatus, the page description data processing method, and the recording medium according to the present invention, it is confirmed whether or not page description data contains an object for stroking a path. If the page description data contains the object for stroking the path, it is confirmed whether or not a dotted line pattern determining operator for determining a dotted line pattern is contained within the object. If the dotted line pattern determining operator for determining the dotted line pattern is contained within the object, the configurations of the line elements formed along the path are estimated based on a path construction operator for constructing the path and the dotted line pattern determining operator, and the path construction operator is replaced with a plurality of path construction operators depending on the configurations of the line elements. Therefore, it is possible to prevent the phenomenon of generating a line element indeterminately in the vicinity of the end point of the path, since a process for approximating the dotted line pattern along the path with a plurality of line elements is not carried out during the rasterizing process of the RIP. Thus, page description data are prevented from leading to printing difficulties during a rasterizing image data process, which includes dotted lines therein.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 6 is a flowchart of a process for replacing a path construction operator;

DESCRIPTION OF THE PREFERRED EMBODIMENTS

A publishing system, which incorporates a page description data processing apparatus, a page description data processing method, and a recording medium according to an embodiment of the present invention, will be described in detail below with reference to the accompanying drawings.

Figure 1:
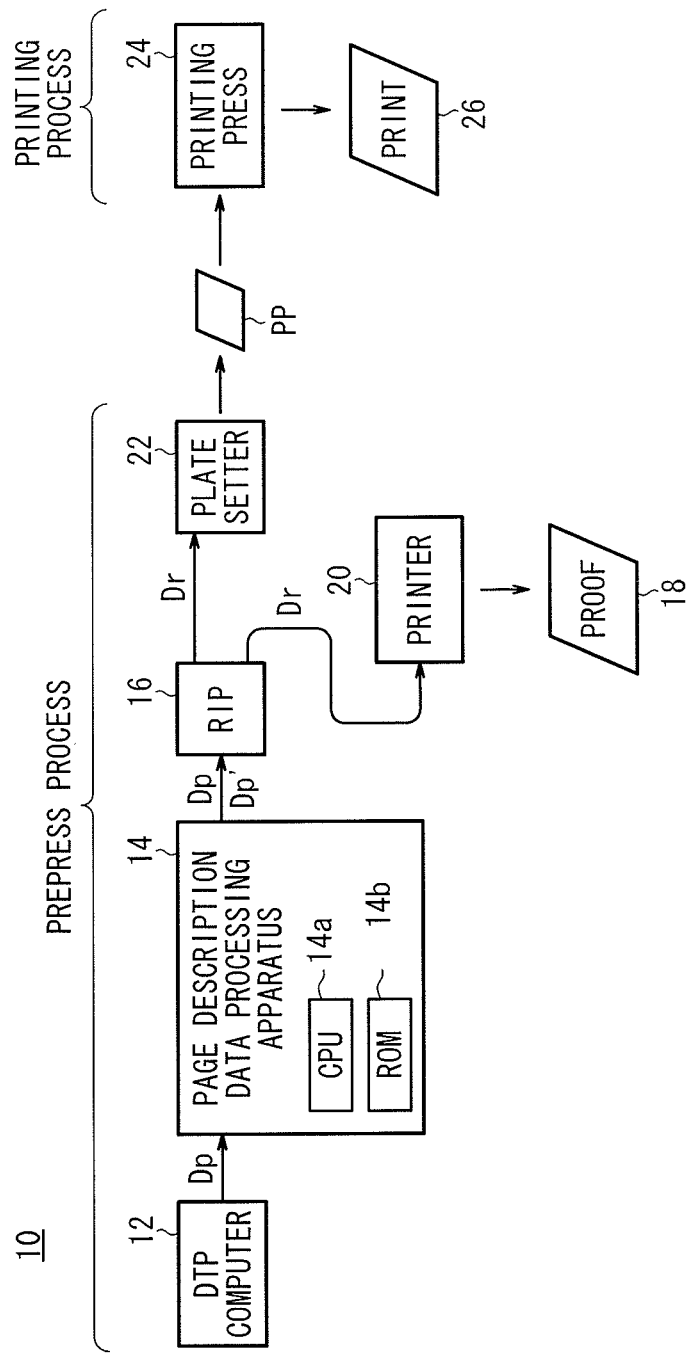
FIG. 1 is a block diagram of a publishing system, which carries out a page description data processing method according to an embodiment of the present invention.

FIG. 1 is a block diagram of a publishing system 10, which carries out a page description data processing method according to an embodiment of the present invention.

As shown in FIG. 1, the publishing system 10 is arranged to perform a prepress process, a printing process, and a bookbinding process (not shown).

The prepress process includes a DTP computer 12, a page description data processing apparatus 14 such as a personal computer or the like, a RIP 16, a printer 20, and a platesetter 22.

The DTP computer 12 generates page description data Dp, which expresses images of respective pages based on elements such as characters and images edited by the user.

The page description data processing apparatus 14 checks the contents (attributes) of the page description data Dp output from the DTP computer 12, performs a particular processing sequence on the page description data Dp, which includes a certain attribute based on the checked contents, and generates the processed page description data Dp as fortified (i.e., more robust) page description data Dp', or outputs the page description data Dp free of the certain attribute. Alternatively, processing functions of the page description data processing apparatus 14 may be incorporated in the DTP computer 12, in which case, the page description data processing apparatus 14 may be dispensed with.

The RIP 16 converts the page description data Dp or the fortified page description data Dp', which is output from the page description data processing apparatus 14, into raster image data Dr in C, M, Y, K colors.

Based on the raster image data Dr, the printer 20 prints a proof 18 as a hard copy.

If the proof 18 printed by the printer 20 is judged as acceptable by the user, then the platesetter 22 generates and outputs printing plates PP in C, M, Y, K colors from the raster image data Dr, which is output from the RIP 16 after the user turns on a start switch of the platesetter 22.

The printing process includes a printing press 24. The printing press 24 includes printing plates PP in C, M, Y, K colors mounted therein, which carry respective C, M, Y, K inks. The printing plates PP transfer the inks onto a sheet of paper, thereby producing a print 26 in multiple colors (four colors).

Figure 2:
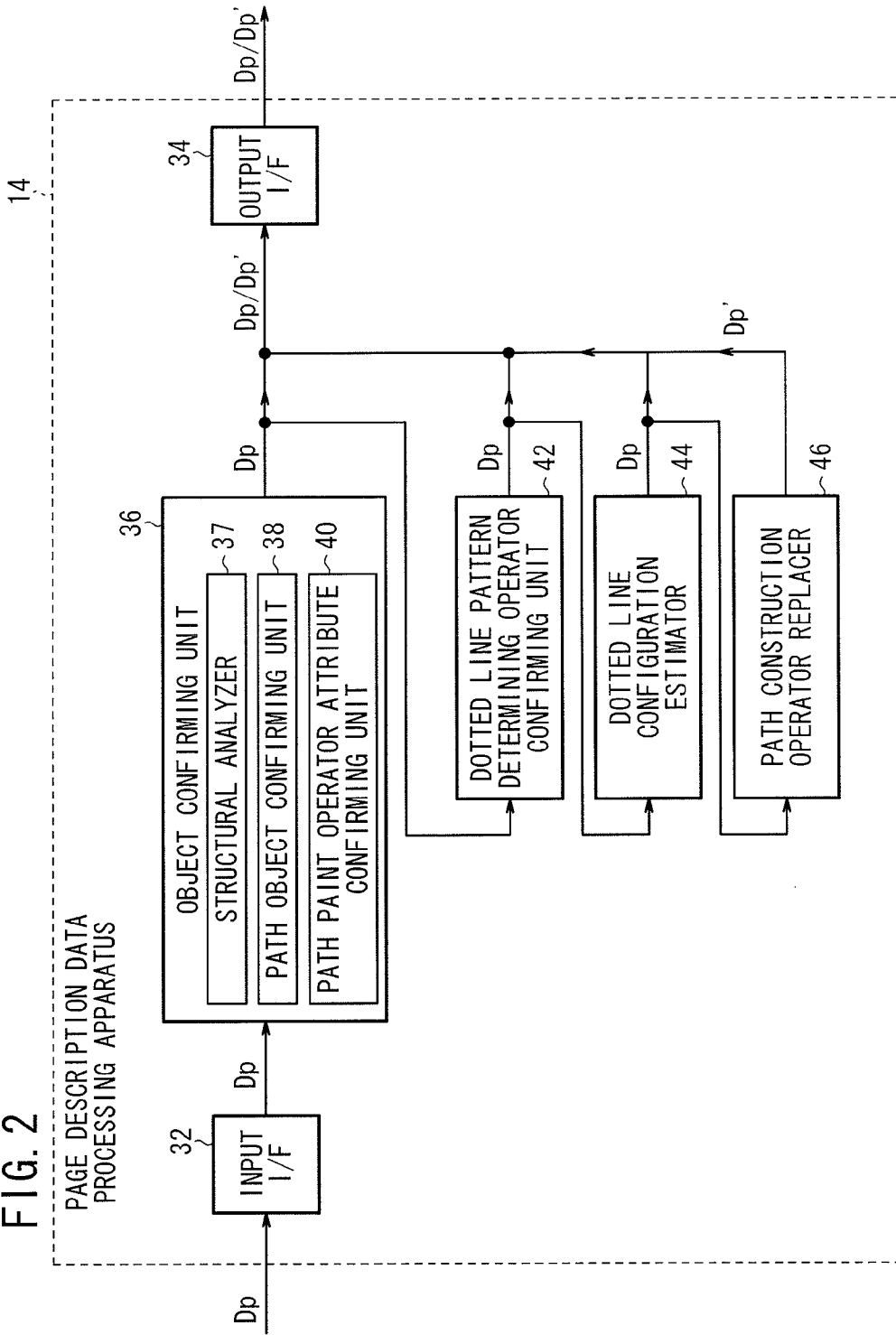
FIG. 2 is a functional block diagram of a page description data processing apparatus of the publishing system shown in FIG. 1.

FIG. 2 is a functional block diagram of the page description data processing apparatus 14. The page description data processing apparatus 14 has respective functions, which are performed when a CPU 14a (see FIG. 1) of the page description data processing apparatus 14 executes a program stored in a ROM 14b.

The program may be recorded in a computer-readable recording medium such as the ROM 14b, a hard disk, a CD-ROM, or the like. The program, which is recorded in the recording medium, may be read and run by a computer system. The computer system includes an OS (operating system) and hardware such as a CPU and peripheral devices. The computer-readable recording medium may also include a medium for dynamically holding programs for a short period of time, such as a communication line that transmits programs over a network such as the Internet or the like or a communication channel such as a telephone line, or a memory for holding programs for a certain period of time, such as a volatile memory in a computer system that serves as a server or a client in a network environment.

The page description data processing apparatus 14 generates fortified page description data Dp' by analyzing page description data Dp supplied via an input interface (input I/F) 32, or generates unchanged page description data Dp. The page description data processing apparatus 14 outputs the fortified page description data Dp' or the unchanged page description data Dp via an output interface (output I/F) 34.

The page description data processing apparatus 14 includes, in addition to the input and output interfaces 32, 34, an object confirming unit 36, which is involved in the analyzing process, a dotted line pattern determining operator confirming unit 42 (operator confirming unit), a dotted line configuration estimator 44, and a path construction operator replacer 46. The object confirming unit 36 comprises a structural analyzer 37, a path object confirming unit 38, and a path paint operator attribute confirming unit 40.

The term "path object" as used herein refers to an arbitrary configuration made up of a linear line, a rectangle, and a curve, e.g., a cubic Bezier curve.

The term "path paint operator" as used herein refers to an operator for finishing a path object, having an attribute either as an operator for applying a line width to a current path to plot a line (hereinafter referred to as "stroking operator" for illustrative purposes), or as an operator for filling a closed space generated by a current path (hereinafter referred to as "filling operator" for illustrative purposes).

The term "dotted line pattern determining operator" as used herein refers to an operator for setting a process for describing a dotted pattern when a path is stroked. According to PDF, one such operator "d" is defined. Defined variables, which can be set by the operator "d", include a "dotted line array" for designating a length for individual line elements and gaps that appear alternately, and a "dotted line phase" for designating a leading position as the start point of a dotted line. A situation in which the "dotted line pattern determining operator" is not included or does not exist is representative not only of the fact that the operator itself does not exist, but also that a variable representing a solid line is set in the operator, indicating that the pattern involved is not a dotted line pattern.

The term "path construction operator" as used herein refers to an operator for defining the physical configuration of a path. According to PDF, seven such operators "m", "l", "c", "v", "y", "h", and "re" are defined.

The term "curved path construction operator" as used herein refers to an operator for adding a curve to a current path from among the path construction operators. According to PDF, three such operators "c", "v", and "y" are defined, each of which serves to add a curve to a cubic Bezier curve.

The term "linear path construction operator" as used herein refers to an operator for adding a linear line to a current path from among the path construction operators. According to PDF, one such operator "l" is defined.

Figure 3:
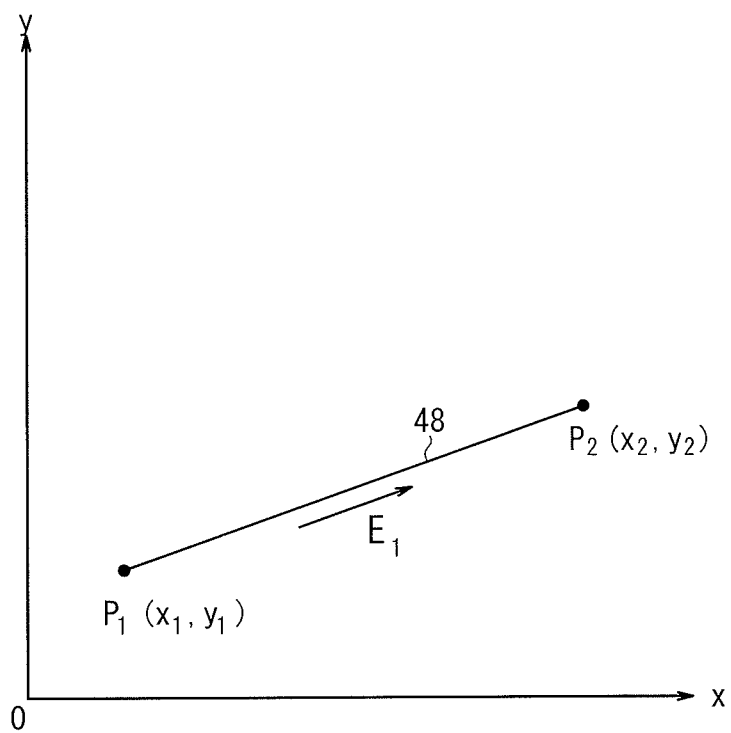
FIG. 3 is a diagram showing a linear path that is generated by a linear stroke operator.

FIG. 3 is a diagram showing a linear line, which is generated by the operator "l". The linear path, which is denoted by reference numeral 48 in FIG. 3, is defined by a start point $P_1$ $(x_1, y_1)$ and an end point $P_2$ $(x_2, y_2)$.

The linear path 48, which interconnects the start point $P_1$ and the end point $P_2$, is generated by changing the value of a variable t from 0 to 1. The coordinates P (x(t), y(t)) of a point on the linear path 48, which are dependent on the variable t, are calculated according to the following equations (1) and (2):

$$x(t)=(1-t)x_1+tx_2 \quad (1)$$

$$y(t)=(1-t)y_1+ty_2 \quad (2)$$

Since, from the equations (1) and (2), $x(0)=x_1$, $y(0)=y_1$, $x(1)=x_2$, and $y(1)=y_2$, when the variable t changes from 0 to 1, the point P on the linear path 48 moves continuously from the start point $P_1$ to the end point $P_2$, along the direction indicated by the arrow $E_1$ in FIG. 3.

Figure 4:
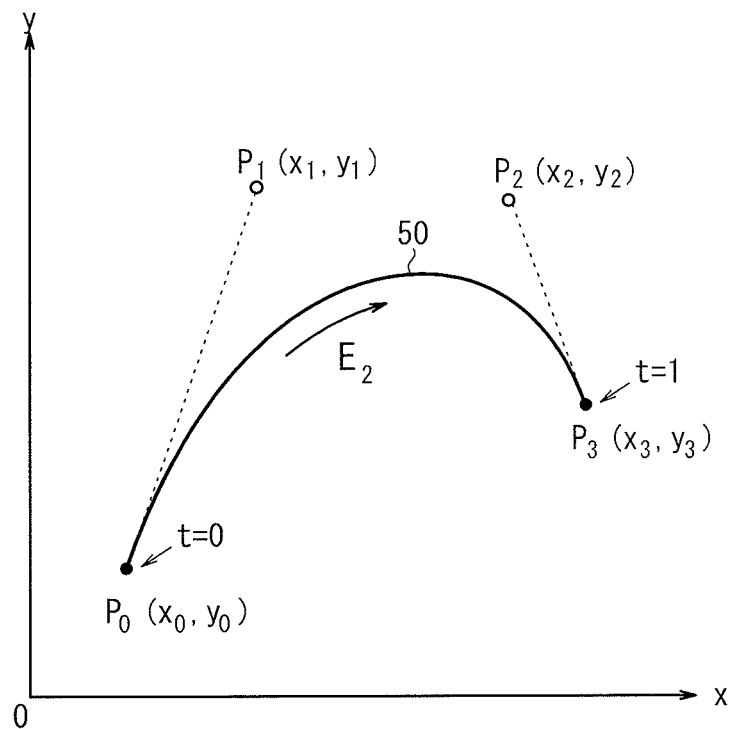
FIG. 4 is a diagram showing a curved path represented by a cubic Bezier curve, which is generated by a curve stroke operator.

FIG. 4 is a diagram showing a cubic Bezier curve, which is generated by the operator "c". The cubic Bezier curve, or a curved path, denoted by 50 in FIG. 4, is defined by two terminal points, i.e., start and end points, $P_0$ $(x_0, y_0)$, $P_3$ $(x_3, y_3)$, and by two control points $P_1$ $(x_1, y_1)$, $P_2$ $(x_2, y_2)$.

The curved path 50, which interconnects the start point $P_0$ and the end point $P_3$, is generated when a variable t changes from 0 to 1. The coordinates P(x(t), y(t)) of a point P on the path 50, which are dependent on the variable t, are calculated by the following equations (3) and (4):

$$x(t)=(1-t)^3x_0+3t(1-t)^2x_1+3t^2(1-t)x_2+t^3x_3 \quad (3)$$

$$y(t)=(1-t)^3y_0+3t(1-t)^2y_1+3t^2(1-t)y_2+t^3y_3 \quad (4)$$

Since, from equations (3) and (4), $x(0)=x_0$, $y(0)=y_0$, $x(1)=x_3$, and $y(1)=y_3$, when the variable t changes from 0 to 1, the point P on the curve path 50 moves continuously from the start point $P_0$ to the end point $P_3$, along the direction indicated by the arrow $E_2$. A line segment $P_0P_1$ indicated by the broken line is a line that is tangential to the curved path 50 at the start point $P_0$. A line segment $P_2P_3$ indicated by the broken line is a line that is tangential to the curved path 50 at the end point $P_3$.

The publishing system 10 basically is constructed as described above. Operations of the page description data processing apparatus 14 of the publishing system 10 will be described below with reference to the flowchart shown in FIG. 5, as well as the functional block diagram shown in FIG. 2.

Figure 5:
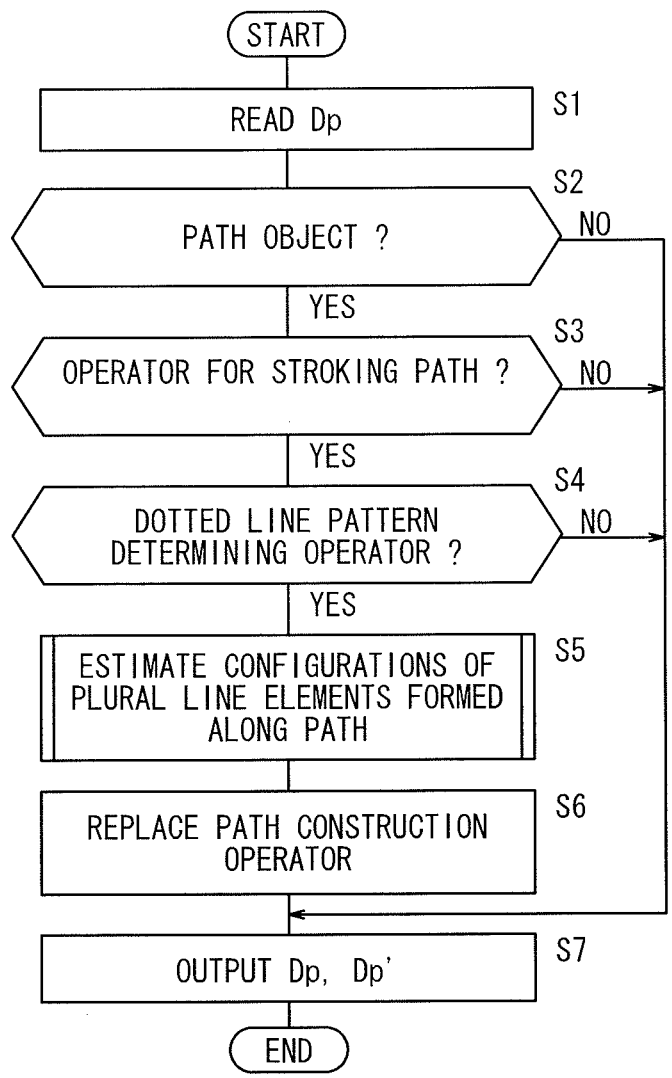
FIG. 5 is a flowchart of an operation sequence of the page description data processing apparatus shown in FIG. 2.

In step S1 shown in FIG. 5, the page description data processing apparatus 14 reads page description data Dp, page by page, which are output from the DTP computer 12.

In step S2, the structural analyzer 37 analyzes the structure of the page description data Dp and extracts an object contained within the pages. Thereafter, the path object confirming unit 38 confirms whether or not a path object is contained within the extracted object. If a path object is not contained within the extracted object, then in step S7, the path object confirming unit 38 outputs page description data Dp, which is unchanged, via the output interface 34.

If a path object is contained within the extracted object, then in step S3, the path paint operator attribute confirming unit 40 confirms whether or not a stroking operator, e.g., an operator "S", "s", or the like, is contained within the path object. If a stroking operator is not contained within the path object, or in other words, if a filling operator "f", F" or the like is contained within the path object, then in step S7, the path paint operator attribute confirming unit 40 outputs page description data Dp, which is unchanged, via the output interface 34.

If a stroking operator is contained within the path object, then in step S4, the dotted line pattern determining operator confirming unit 42 confirms whether or not a dotted line pattern determining operator, i.e., an operator "d", is contained within the path object. If a dotted line pattern determining operator is not contained within the path object, then in step S7, the dotted line pattern determining operator confirming unit 42 outputs page description data Dp, which is unchanged, via the output interface 34.

If a dotted line pattern determining operator is contained within the path object, then in step S5, the dotted line configuration estimator 44 estimates the configurations of a plurality of line elements generated along the path, based on the path object confirmed in step S2, along with the dotted line pattern determining operator that was confirmed in step S4. An estimating process, which is carried out by the dotted line configuration estimator 44, will be described below with reference to the flowchart shown in FIG. 6.

In step S51 shown in FIG. 6, the dotted line configuration estimator 44 acquires parameters for determining a path from the path construction operator. In the example shown in FIG. 3, parameters that are acquired in step S51 by the dotted line configuration estimator 44 include the operator attribute "l", the start point $P_1$ $(x_1, y_1)$, and the end point $P_2$ $(x_2, y_2)$. In the example shown in FIG. 4, parameters that are acquired in step S51 by the dotted line configuration estimator 44 include the operator attributes "c", "v", or "y", the start point $P_0$ $(x_o, y_o)$, the end point $P_3$ $(x_3, y_3)$, the control point $P_1$ $(x_1, y_1)$, and the control point $P_2$ $(x_2, y_2)$.

Furthermore, in order to establish a correspondence between a user space (device-independent coordinate system) and a device space (device-dependent coordinate system), the dotted line configuration estimator 44 also acquires vertical and horizontal rasterizing resolutions. The resolutions may be in units such as dpi (dot per inch), ppi (pixel per inch), or the like.

In step S52, the dotted line configuration estimator 44 acquires parameters for determining a dotted line pattern. The parameters that are acquired in step S52 by the dotted line configuration estimator 44 include "dotted line array" and "dotted line phase" (dotted line configuration parameters) set in the operator "d".

In step S53, the dotted line configuration estimator 44 estimates the positions of start and end points of a plurality of line elements. A process for estimating the position of the start point of a line element within the user space will be described in detail below.

If the coordinates of the point P on the paths 48, 50 are represented by (x(t), y(t)), then the length l(u, v) of a line segment of the paths 48, 50 within an interval [u, v] is calculated according to the following equation (5):

$$l(u,v) = \int_u^v \sqrt{[x'(t)]^2 + [y'(t)]^2} \, dt \quad (5)$$

where $0 \leq u \leq$, $0 \leq v \leq 1$. The position of the start point of the line element can be estimated based on equation (5).

An operation sequence of the dotted line configuration estimator 44, for estimating positions of the start and end points of line elements in the example of the linear path 48 shown in FIG. 3, will be described below.

Figure 7A:
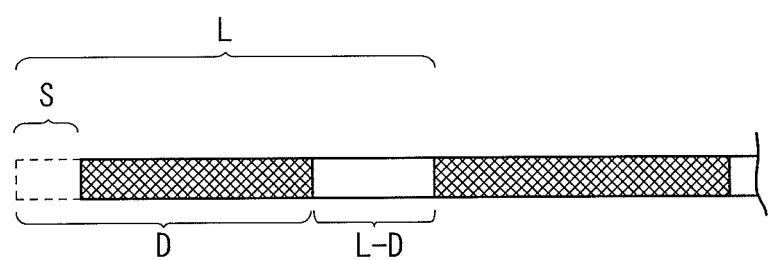
FIG. 7A is a diagram showing dotted line configuration parameters by way of example.

As shown in FIG. 7A, it is assumed that dotted line configuration parameters are set to [D L-D] {S} where D, L and S are positive numbers, which may be of either integer or real values.

Figure 7B:
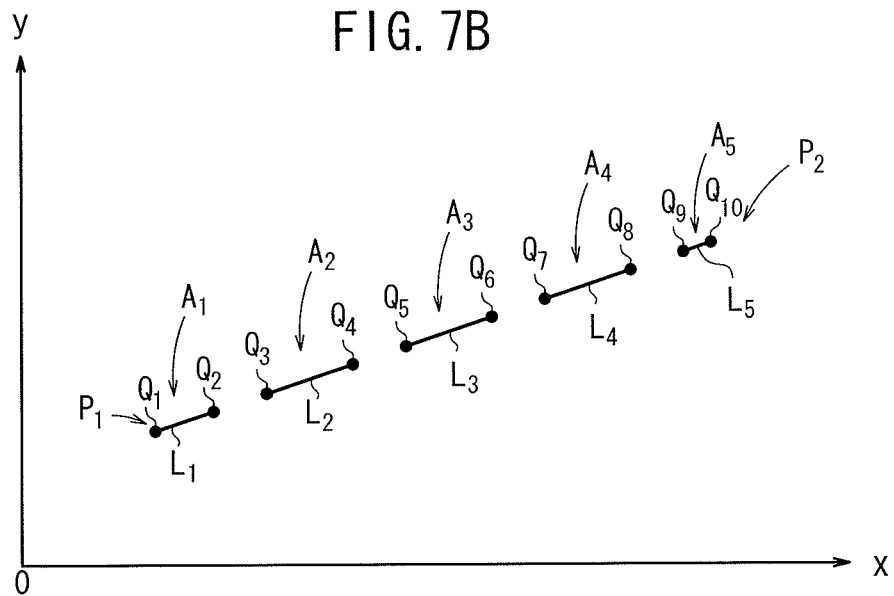
FIG. 7B is a diagram showing a dotted line pattern, which is generated along the linear line shown in FIG. 3.

As shown in FIG. 7B, the configurations of five line elements $A_1$ through $A_5$, or more specifically, the positions of start points $\{Q_1, Q_3, Q_5, Q_7, Q_9\}$ and end points $\{Q_2, Q_4, Q_6, Q_8, Q_{10}\}$ thereof, can be estimated based on the start point $P_1$ ($x_1$, $y_1$), the end point $P_2$ ($x_2$, $y_2$), and the above dotted line configuration parameters. A process of estimating the configurations of five line elements $A_1$ through $A_5$ will be described in detail below.

First, the position of the start point $Q_1$ of the line element $A_1$, which has a length $L_1$, and which serves as a plotting start position, can be estimated as the position ($t_1 = 0$) of the start position $P_1$ of the path 48. Then, $t_2$, which satisfies the relation $I(t_1, t_2) = D-S$, is calculated, and a position corresponding to $t = t_2$ is calculated according to equations (1) and (2). The position of the end point $Q_2$ of the line element $A_1$ can be estimated as a position (x($t_2$), y($t_2$)).

Then, $t_3$, which satisfies the relation $I(t_2, t_3) = L-D$, is calculated, and a position corresponding to $t = t_3$ is calculated according to equations (1) and (2). The position of the start point $Q_3$ of the line element $A_2$, which has a length $L_2$, can be estimated as a position (x($t_3$), y($t_3$)). Then, $t_4$, which satisfies the relation $I(t_3, t_4) = D$, is calculated, and a position corresponding to $t = t_4$ is calculated according to equations (1) and (2). The position of the end point $Q_4$ of the line element $A_2$ can be estimated as a position (x($t_4$), y($t_4$)).

Similarly, the coordinates of the start points $\{Q_1, Q_3, Q_5, Q_7, Q_9\}$ and the end points $\{Q_2, Q_4, Q_6, Q_8, Q_{10}\}$ are estimated. In the present embodiment, positions of both start and end points of the line elements are estimated. However, positions of only the start points may be estimated, while positions of the end points are not estimated.

An operation sequence of the dotted line configuration estimator 44, for estimating positions of start and end points of line elements in the example of the curved path 50 shown in FIG. 4, will be described below. Since complex calculations are required in order to identify a curved configuration, and a line element is highly likely to become uncertain near the end point of the path 50, the operation sequence of the dotted line configuration estimator 44 is highly effective. It is assumed that dotted line configuration parameters are set as shown in FIG. 7A.

Figure 8:
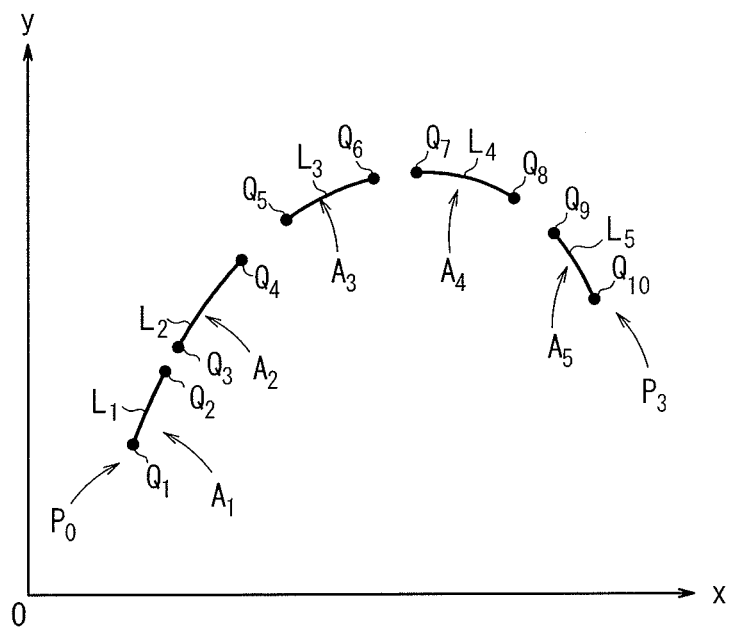
FIG. 8 is a diagram showing a dotted line pattern, which is generated along the curved path shown in FIG. 4.

As shown in FIG. 8, the configurations of five line elements $A_1$ through $A_5$, or more specifically, the coordinates of start points $\{Q_1, Q_3, Q_5, Q_7, Q_9\}$ and end points $\{Q_2, Q_4, Q_6, Q_8, Q_{10}\}$ thereof, can be estimated based on the start point $P_0$ ($x_0$, $y_0$), the end point $P_3$ ($x_3$, $y_3$), and the above dotted line configuration parameters. A process of estimating the configurations of five line elements $A_1$ through $A_5$ will be described in detail below.

First, as a plotting start position, the position of the start point $Q_1$ of the line element $A_1$, which has a length $L_1$, can be estimated as the position ($t_1 = 0$) of the start position $P_0$ of the path 50. Then, $t_2$, which satisfies the relation $I(t_1, t_2) = D-S$, is calculated, and a position corresponding to $t = t_2$ is calculated according to equations (3) and (4). The position of the end point $Q_2$ of the line element $A_1$ can be estimated as the position (x($t_2$), y($t_2$)).

Then, $t_3$, which satisfies the relation $I(t_2, t_3) = L-D$, is calculated, and a position corresponding to $t = t_3$ is calculated according to equations (3) and (4). The position of the start point $Q_3$ of the line element $A_2$, which has a length $L_2$, can be estimated as a position (x($t_3$), y($t_3$)). Then, $t_4$, which satisfies the relation $I(t_3, t_4) = D$, is calculated, and a position corresponding to $t = t_4$ is calculated according to equations (3) and (4). The position of the end point $Q_4$ of the line element $A_2$ can be estimated as a position (x($t_4$), y($t_4$)).

Similarly, the coordinates of the start points $\{Q_1, Q_3, Q_5, Q_7, Q_9\}$ and the end points $\{Q_2, Q_4, Q_6, Q_8, Q_{10}\}$ are estimated in the same manner.

One curved path construction operator may be replaced with a plurality of linear path construction operators corresponding to a polygonal path, and the above estimating process may be performed based on the plurality of linear path construction operators. Such an alternative approach requires simpler calculations and results in a shorter processing time.

In step S54 shown in FIG. 6, the dotted line configuration estimator 44 determines whether the start point of a final line element agrees with the end point of the path or not. The final line element refers to a line element closest to the end point of the path. In FIGS. 7B and 8, the final line element corresponds to the line element $A_5$. If the start point of the final line element does not agree with the end point of the path, i.e., if the length of the final line element is not 0, then the operation sequence of the dotted line configuration estimator 44 is ended. If the start point of the final line element agrees with the end point of the path, i.e., if the length of the final line element is 0, then control goes from step S54 to step S55.

In step S55, the dotted line configuration estimator 44 changes the length of the final line element to a length which is non-0. A specific process and advantages of changing the dotted line configuration estimator 44 to a non-0 length will be described below with reference to FIGS. 9A through 9C.

Figure 9A:
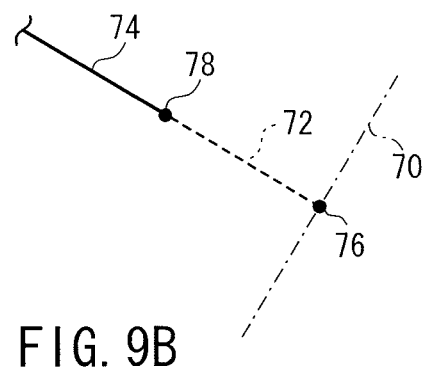
FIGS. 9A through 9C are diagrams showing the result of a capping process performed on a line element whose length is set to 0 or non-0.

It is assumed that, as shown in FIG. 9A, in stroking a path 72 extending up to an end point position 70 with a dotted line pattern, a line element 74 and a line element whose length is 0 (also referred to as "dot element 76") are extracted. A square cap is applied to an end point 78 of the line element 74 and the dot element 76. The term "square cap" refers to a capping process for continuously stroking a line element beyond the end point of the path for a distance equal to half the line width and then being squared off. For details, reference should be made to PDF Reference, second edition, Adobe Portable Document Format Version 1.3, initial edition, 1st printing, published July, 2000, Author: Adobe Systems, Publisher: Pearson Education, ISBN 0-201-61588-6, page 139.

Figure 9B:
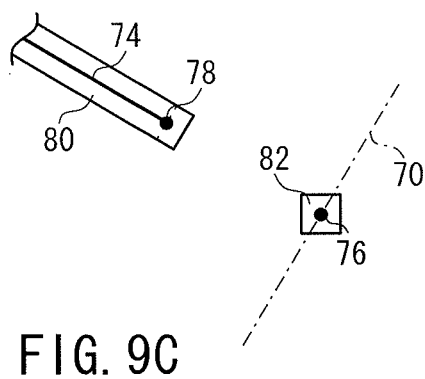

As shown in FIG. 9B, the line element 74 is stroked along the path 72, forming a filled area 80. A square cap is applied to both ends of the dot element 76, forming a rectangular filled area 82. Since the length of the dot element 76 is 0, it is unable to identify a direction in which the dot element 76 extends. If there is a predetermined rule for applying a square cap with θ=0° (so as to extend horizontally), then an inappropriate print may possibly result from the positional relationship between the rectangular filled area 82 and the filled area 80.

Figure 9C:
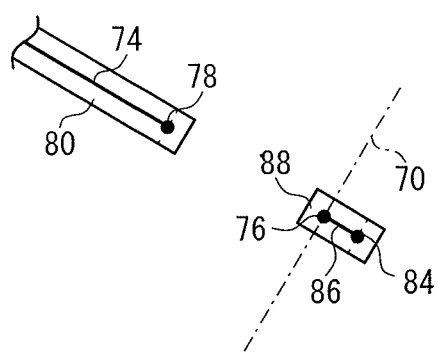

To solve the above problem, the dot element 76 is elongated to a length of non-0, i.e., over two or more pixels, in alignment with the direction of the line element 74 which is the second line element from the final line element, i.e., the direction of the path 72. Then, as shown in FIG. 9C, a new oblique line element 86 is formed which has a start point at the dot element 76 and an end point 84. The line element 86 is stroked along the path 72, forming a filled area 88. Since the cap applied to the line element 86 has its direction aligned with the direction of the path 72, an appropriate print will be produced from the positional relationship between the filled area 88 and the filled area 80.

As described above, the dotted line configuration estimator 44 determines whether the start point of a final line element agrees with the end point of the path or not in step S54 shown in FIG. 6. Alternatively, the dotted line configuration estimator 44 may also determine whether the end point of a leading line element agrees with the start point of the path or not, and may change the length of the leading line element to a non-0 length if the end point of the leading line element agrees with the start point of the path.

As described above, the configurations of the line elements formed along the paths 48, 50, 72 are estimated in step S5 shown in FIG. 5.

In step S6 shown in FIG. 5, the path construction operator replacer 46 replaces the path construction operator of the path object confirmed in step S2 with a plurality of linear path construction operators (the length of each path is non-0) corresponding to the configurations of the line elements estimated in step S5.

In FIG. 7B, the path construction operator replacer 46 replaces the linear path construction operator {hereinafter referred to as "LOP $(P_1, P_2)$"} having a start point $P_1$ and an end point $P_2$ with five linear path construction operators, i.e., LOP $(Q_1, Q_2)$, LOP $(Q_3, Q_4)$, LOP $(Q_5, Q_6)$, LOP $(Q_7, Q_8)$, LOP $(Q_9, Q_{10})$. The linear path construction operators set the dotted line configuration parameters to values such that the path will be stroked with solid lines according to the same line width as before the linear path construction operator is replaced. Therefore, the process of replacing the linear path construction operator is simplified and the dotted line pattern is reproduced accurately.

In FIG. 8, the path construction operator replacer 46 replaces the curved path construction operator {hereinafter referred to as "COP $(P_0, P_3)$"} having a start point $P_0$ and an end point $P_3$ with five linear path construction operators, i.e., LOP $(Q_1, Q_2)$, LOP $(Q_3, Q_4)$, LOP $(Q_5, Q_6)$, LOP $(Q_7, Q_8)$, LOP $(Q_9, Q_{10})$.

Alternatively, the path construction operator replacer 46 may replace the curved path construction operator COP $(P_0, P_3)$ with five curved path construction operators, i.e., COP $(Q_1, Q_2)$, COP $(Q_3, Q_4)$, COP $(Q_5, Q_6)$, COP $(Q_7, Q_8)$, COP $(Q_9, Q_{10})$. In this case, two control points are appropriately determined for each of the curved path construction operators in order to guarantee the accuracy with which to approximate the line elements $A_1$ through $A_5$.

Then, in step S7, the path construction operator replacer 46 outputs the page description data Dp', the path construction operator of which is replaced thereby, via the output interface 34.

Figure 10A:
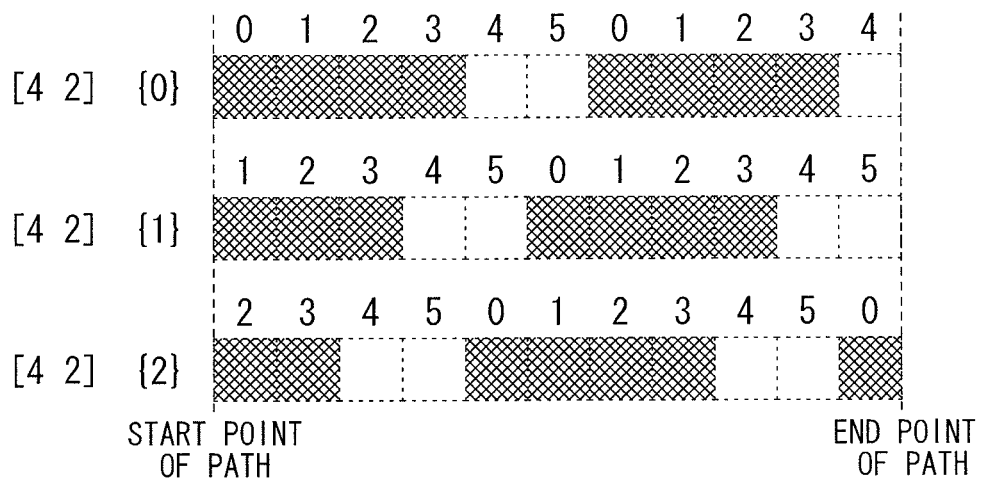
FIG. 10A is a diagram showing the relationship between dotted line configuration parameters and a dotted line pattern that actually is plotted.
Figure 10B:
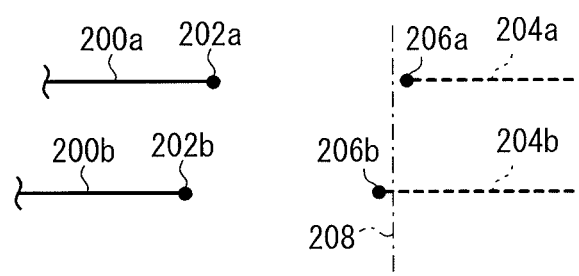
FIGS. 10B and 10C are diagrams showing dotted line patterns generated by imparting a certain line width to linear paths according to a stroking process.
Figure 10C:
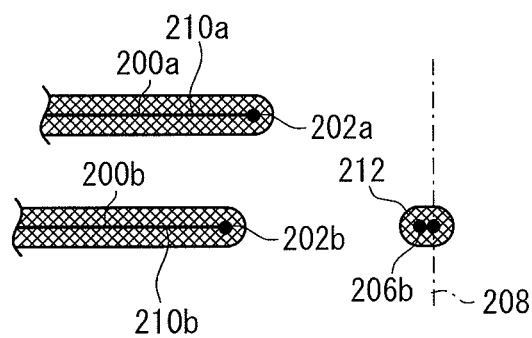

Therefore, as shown in FIG. 1, the page description data Dp, which are supplied to the page description data processing apparatus 14, are supplied to the RIP 16 either as unchanged page description data Dp, or as page description data Dp' with the path construction operator thereof being replaced. As a result, the page description data processing apparatus 14 can stably output the page description data Dp or the page description data Dp' which are always free of the filled area (see an upper section of FIG. 10C) or always include a filled area 212 (see a lower section of FIG. 10C).

As described above, the page description data processing apparatus 14 confirms whether the page description data Dp contains an object for stroking the paths 48, 50 or not, confirms whether a dotted line pattern determining operator for determining a dotted line pattern is contained within the object or not, estimates the configurations of the line elements $A_1$ through $A_5$ formed along the paths 48, 50 based on the path construction operator for constructing the paths 48, 50 and the dotted line pattern determining operator, and, replaces the path construction operator with a plurality of path construction operators depending on the configurations of the line elements $A_1$ through $A_5$. Therefore, it is possible to prevent the phenomenon of generating a line element indeterminately in the vicinity of the end points of the paths 48, 50, since a process for approximating the dotted line pattern along the paths 48, 50 with a plurality of line elements is not carried out during the rasterizing process of the RIP 16. Thus, the page description data are prevented from leading to printing difficulties during a rasterizing image data process, which includes dotted lines therein.

While page description data in accordance with a PDF format have been described above, the present invention is not limited to PDF, but may also be applicable to other page description languages, such as PostScript (registered trademark of Adobe Systems Inc.) and XPS (XML Paper Specification).

Although a certain preferred embodiment of the present invention has been shown and described in detail, it should be understood that various changes and modifications may be made to the embodiment without departing from the scope of the invention as set forth in the appended claims.

What is claimed is:

1. A page description data processing apparatus comprising:
    an object confirming unit which confirms whether or not page description data contains an object for stroking a path;
    an operator confirming unit which, if the page description data contains the object for stroking the path, confirms whether or not a dotted line pattern determining operator for determining a dotted line pattern is contained within the object;
    a dotted line configuration estimator which, if the dotted line pattern determining operator for determining the dotted line pattern is contained within the object, estimates configurations of a plurality of line elements formed along the path based on a path construction operator for constructing the path and the dotted line pattern determining operator; and a path construction operator replacer which replaces the path construction operator with a plurality of path construction operators depending on the configurations of the line elements.

2. The page description data processing apparatus according to claim 1, wherein the dotted line configuration estimator estimates the configurations of the line elements formed along a curved path.

3. The page description data processing apparatus according to claim 1, wherein the path construction operator replacer replaces the path construction operator with a plurality of linear path construction operators depending on the configurations of the line elements.

4. The page description data processing apparatus according to claim 1, wherein the path construction operator replacer replaces the path construction operator with the plurality of path construction operators for making a length of each path non-0.

5. A page description data processing method comprising the steps of:
   confirming whether or not page description data contains an object for stroking a path;
   if the page description data contains the object for stroking the path, confirming whether or not a dotted line pattern determining operator for determining a dotted line pattern is contained within the object;
   if the dotted line pattern determining operator for determining the dotted line pattern is contained within the object, estimating configurations of a plurality of line elements formed along the path based on a path construction operator for constructing the path and the dotted line pattern determining operator; and
   replacing the path construction operator with a plurality of path construction operators depending on the configurations of the line elements.

6. A Non-Transitory recording medium storing therein a program that controls a computer to inspect an attribute of page description data and to perform a process depending on the inspected attribute on the page description data, the program enabling the computer to function as:
   an object confirming unit which confirms whether or not the page description data contains an object for stroking a path;
   an operator confirming unit which, if the page description data contains the object for stroking the path, confirms whether or not a dotted line pattern determining operator for determining a dotted line pattern is contained within the object;
   a dotted line configuration estimator which, if the dotted line pattern determining operator for determining the dotted line pattern is contained within the object, estimates configurations of a plurality of line elements formed along the path based on a path construction operator for constructing the path and the dotted line pattern determining operator; and
   a path construction operator replacer which replaces the path construction operator with a plurality of path construction operators depending on the configurations of the line elements.

* * * * *